Sept. 16, 1969   M. W. TURCOTTE   3,467,431
COVER FOR DUMP TRUCK BODIES
Filed March 4, 1968
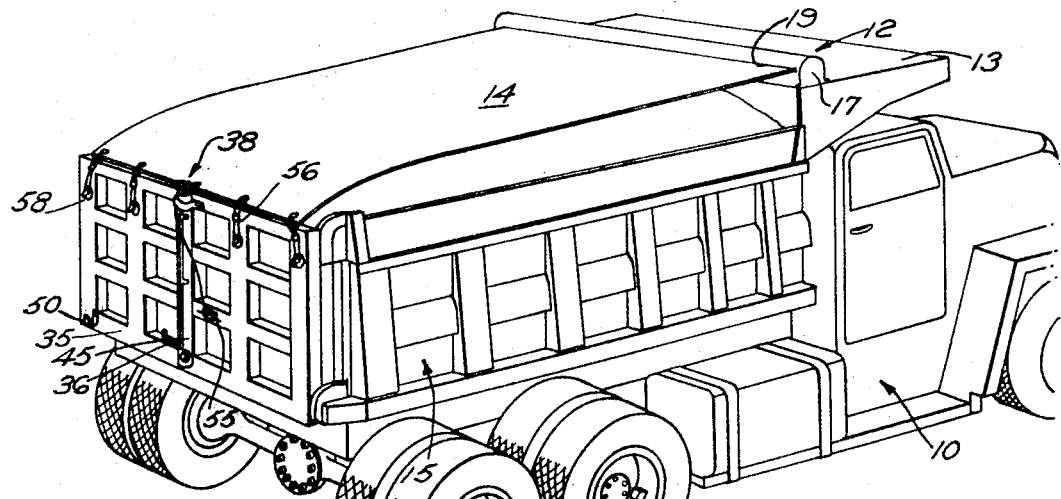
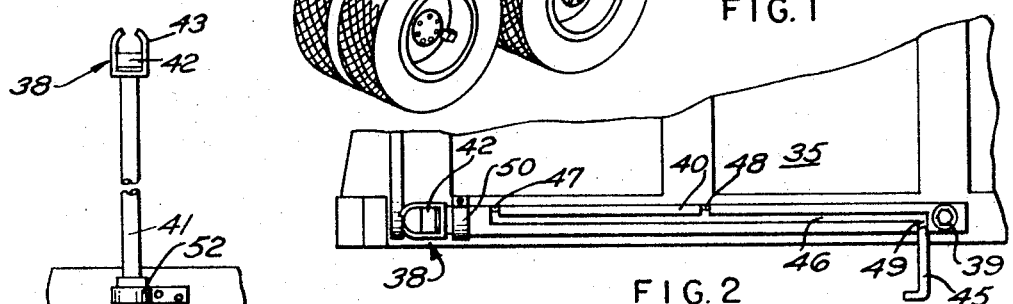
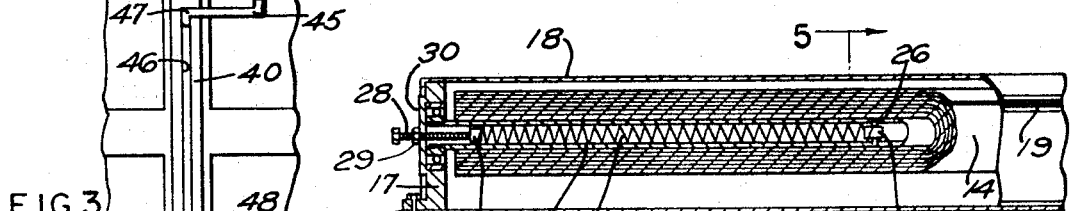
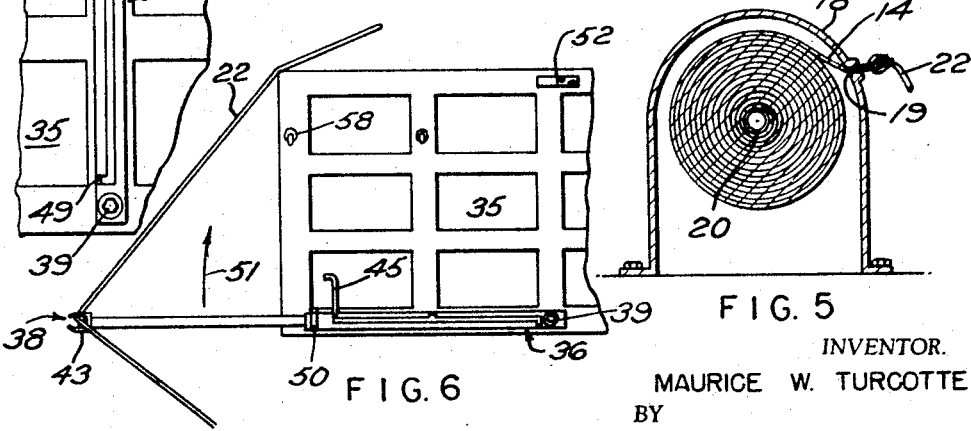
INVENTOR.
MAURICE W. TURCOTTE
BY
Barlow & Barlow
ATTORNEYS United States Patent Office 3,467,431
Patented Sept. 16, 1969

3,467,431
COVER FOR DUMP TRUCK BODIES
Maurice W. Turcotte, 90 Ellis St.,
Seekonk, Mass. 02771
Filed Mar. 4, 1968, Ser. No. 710,015
Int. Cl. B60j 7/10, 7/16
U.S. Cl. 296—98                                    6 Claims

ABSTRACT OF THE DISCLOSURE

A cover for a truck particularly of the dump truck type where the cover is mounted on a spring reel over the cab section of the truck and is adapted to be drawn rearwardly over the open body of the truck by means of a cord that passes through the end of a rod which may be elevated above the upper edge of the tailgate of the truck so as to permit the cover to be drawn over a load such as gravel or the like that extends above the side walls of the body particularly at the center thereof, the rod is preferably telescoping so that it may be withdrawn to a level even with the upper edge of the tailgate and fastening means may be provided for the cover to fasten the same to the tailgate of the truck, the spring in the reel upon which the cover is mounted holding the other end of the cover in fixed position.

Background of the invention

Local and state highway regulations in many areas require that trucks hauling loose material such as sand and gravel have the top of the open body of the truck covered with a tarpaulin. In the past it has been customary for the truckers to carry the tarpaulin in a convenient location and when the truck is loaded, it is necessary that they spread this tarpaulin over the load which may be gravel and sand. To spread a tarpaulin over the body of a large dump truck requires that one get up on the dump body itself and move from one side to the other in order to spread the tarpaulin and then the tarpaulin must be tied down at its four corners to secure the same in position. This is a time consuming process and it is therefore desirable that some form of arrangement be provided so that it will be unnecessary to climb up upon the body of the truck to pull a tarpaulin over the loose load. In large dump trucks it should be remembered that the top of the truck body is some nine feet above the ground. It can be readily appreciated that this is an inconvenient operation. It has been proposed to have covers for vehicle bodies which wind up on a spring-loaded load, such as, for example, as shown in the Reiman Patent No. 2,230,-908, but there has never been a provision for drawing the cover rearwardly over a high vehicle such as a dump truck.

Summary of the invention

A cover for a vehicle such as a dump truck is provided in sheet-like form wound up upon a reel which is preferably mounted over the cab area of a truck. The drum is spring-loaded to maintain the cover in wound position. There is at least a single line affixed to the cover so that the cover may be unwound from the reel like a curtain shade is unwound. On the rear of the truck at the tailgate area a post with a roller at its upper end is provided and the cord for unwinding the sheet-like material is placed over this roller and the post elevated to a suitable position so that the cover may be fully unwound over the load and then the post is retracted so as to pull the free end of the cover down over the load whereupon the edge of the cover is fastened to the tailgate. In one form of the invention the post is pivoted to the bottom of the tailgate so that the same may be readily swung up into operating position and preferably the post is made telescoping so that the same may be extended and thn withdrawn easily.

Description of the drawings

FIG. 1 is a perspective view of a truck having the invention installed thereon, with the cover in operating position over the load;

FIG. 2 is an enlarged detail showing the post hingedly attached to the tailgate of the truck in stored position;

FIG. 3 is a fragmentary view of the tailgate of the truck with the post in fully elevated position;

FIG. 4 is a fragmentary view partly in section showing the reel with the sheet material wound thereon;

FG. 5 is a sectional view taken on lines 5—5 of FIG. 4;

FIG. 6 is a fragmentary view showing the post in extended relationship with the pull cord engaged therewith prior to being pivoted to operating position.

Description of the preferred embodiments

Referring to the drawings there is illustrated a dump truck generally designated by the numeral 10 which has installed thereon the apparatus of the present invention, which broadly includes at least an elongated housing 12 mounted on the front end of the cab protection platform designated 13 in which housing 12 there is stored a cover 14 of flexible material which is adapted to extend rearwardly over the open body 15 of the truck.

The elongated housing 12 in which the cover 14 is received is formed by a pair of end plates 17 that are bolted to the extension platform 13 and between the two end members 17 a sheet metal cover 18 having a slot opening 19 is fastened. A spring reel 20 is generally received in the end members 17 and the flexible cover 14 is wound about this reel 20. The width of the cover 14 is sufficient to extend substantially across the opened top of the dump body 15 and substantially centrally of the cover 14 a pull line 22 is fastened (see FIG. 5). The reel 20 has a spring 24 fitted therein, the spring 24 being a long helical spring with one end fastened to a block 25 which in turn is pinned by pin 26 to the reel 20. The other end of the spring 24 is fastened to a block 27 which is secured to an adjustment bolt 28 that passes through the outer journalled end of the reel 20 and this adjustment bolt 28 may be rotated to vary the tension on the spring 24. The position of adjusting bolt 28 is maintained by a nut 29 which bears against a boss 30 that is part of the end support 17.

The tailgate 35 of the dump truck body has fitted thereon a guide post generally designated 36. This guide post can assume a number of configurations, but in all cases it includes at its upper end a roller and guide means generally designated 38 which receive the line 22 to enable the operator to readily pull the cover back over the body 15. To this end, the post 36 may be affixed in a vertical position such as is generally illustrated in FIG. 1 or if the load is large and extends above the upper edge of the tailgate 35 the post may be made telescoping and may be pivotally received on the lower end of the tailgate by a pivot bolt 39. In the telescoping configuration the post 36 is made up of an outer cylindrical member 40 and an inner cylindrical member 41 which is slidingly received within the outer member 40. At the upper end of the inner member 41 a roller guide means 38 is received which specifically consists of a roller 42 that is mounted between a pair of upwardly extending ears 43 that are inwardly turned at their upper ends so as to prevent the dislodgement of a line such as 22 that is passed therethrough. A handle 45 is secured to the inner member 41 near the lower end thereof and extends radially outward from the inner post 41 through a slot 46 that is cut into the wall of the outer member 40 and which is provided with three locking recesses as at 47, 48 and 49.

In the telescoping embodiment the post 36 is normally at rest in a horizontal position such as is shown in FIG. 2 resting in a spring clip 50 that is mounted on the bottom edge of the tailgate 35. The inner post 41 is completely withdrawn and the handle 45 is resting within the locking recess 49 remaining there by gravity which maintains the inner post within the outer post. When it is desired to pull the cover 14 over the body 15 of the truck, the handle 45 is lifted to substantially a horizontal position and is slid along the groove 46 and into the recess 47. The post then assumes the position as shown in FIG. 6 of the drawings and the line 22 that extends from the cover 14 and which has been conveniently secured alongside the truck body 15 as at the forward end thereof is now moved rearwardly and passed through the ears 43 of the roller member 38 as illustrated in FIG. 6 and then the entire post assembly 36 is then pivoted clockwise as shown by the arrow 51 to a position such as is shown in FIG. 3. In this position the post will be retained by a spring clip 52 and will maintain the line 22 in a sufficiently elevated position above the tailgate 35 so that the cover 14 may be drawn rearwardly by pulling on the line 22 until the end of the cover 14 abuts the roller guide 38. When this position has been reached, the line 22 may be placed between the tailgate and the handle 45 so that the line may be pulled away from the tailgate to pull the handle outwardly from the tailgate and into the slot 46 whereupon the inner post 41 will descend by sheer gravity to its lowermost position where the handle 45 will come up against the lower end of the slot 46. The line 22 may then be securely fastened to a cleat means such as 55 and hook straps such as 56 that are attached to the rear end of the cover 14 and which are provided with eyes may then have the eye portion placed over hooks 58 whose free ends are downwardly extending so that the entire rear edge of the cover 14 is secured in position. The spring tension developed by the spring 24 within the roller 20 is sufficient to maintain the forward end of the cover 14 in position.

When it is desired to release the cover 14 after reaching the destination and before discharging the load, the members 56 will be released from their hooks 58 and the line 22 may be released from its cleat 55. The resilient action of the roller 20 will now wind the cover 14 thereabout as soon as the free end of the cover 14 reaches the slot 19, it will be prevented from retracting fully therein by means of the hem *h* on the free end of the cover 14, then the line 22 may be conveniently wound and stored on means located at the forward end of the dump body 15. Tailgate release latch may then be disengaged and the load dumped by the usual means of lifting the body 15.

It can be seen that the apparatus of the present invention provides a quick and easy means for covering and uncovering a dump truck to comply with the local laws that state that gravel and the like loads must be transported over the highways covered with a tarpaulin or the like. The simplicity of operation enables any individual to use the apparatus with rapidity and without climbing on the dump truck body 15 in order to place a cover thereover and then latch the same down in place at both ends thereof.

I claim:

1. In a dump truck having a body, a spring reel, means for mounting said reel on said truck body at the forward portion thereof, a cover member wound on said reel and having a cord extending from the free end thereof, a post mounted on the rear end of the truck body spaced horizontally a substantial distance from said reel, means for vertically adjusting said post, said post carrying at the upper end guiding means for said cord, said cover being adapted to be withdrawn substantially horizontally from about said spring reel by said cord being passed over said guiding means whereby said cover may be pulled rearwardly over the dump truck body.

2. A truck body cover as in claim 1 wherein said post has telescoping portions one of which may be elevated above the rear end of the truck body.

3. A truck body cover as in claim 1 wherein said post carries a roller and guide ears on either side of said roller between which said cord extends.

4. A truck body cover as in claim 3 wherein said ears support said roller.

5. A truck body cover as in claim 1 wherein said post is pivotally mounted at the lower edge of the rear end of said truck body.

6. A truck body cover as in claim 1 wherein said post is pivotally mounted at the lower edge of the rear end of said truck body and wherein said post has telescoping portions having means to maintain the post in an outwardly telescoped and inwardly telescoped position and means on said truck body for holding said telescoping post in a horizontal stored or vertical operating position.

References Cited

UNITED STATES PATENTS 1,526,346  2/1925  Kivikink _____ 160—265

FOREIGN PATENTS 693,979  7/1950  Great Britain.

BENJAMIN HERSH, Primary Examiner

R. R. SONG, Assistant Examiner